(12) United States Patent
Suresh et al.

(10) Patent No.: US 9,292,323 B2
(45) Date of Patent: Mar. 22, 2016

(54) CONTEXT AWARE VIRTUAL DESKTOP

(71) Applicant: Citrix Systems, Inc., Fort Lauderdale, FL (US)

(72) Inventors: Ashwin Suresh, Pompano Beach, FL (US); Mukund Ingale, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 307 days.

(21) Appl. No.: 13/896,528

(22) Filed: May 17, 2013

(65) Prior Publication Data

US 2014/0344806 A1    Nov. 20, 2014

(51) Int. Cl.
| | | |
|---|---|---|
| G06F 3/00 | (2006.01) | |
| G06F 9/455 | (2006.01) | |
| G06F 9/44 | (2006.01) | |
| G06F 17/30 | (2006.01) | |

(52) U.S. Cl.
CPC .......... G06F 9/45533 (2013.01); G06F 9/4445 (2013.01); G06F 17/30241 (2013.01)

(58) Field of Classification Search
CPC .............................................. G06F 17/30241
USPC ....................................................... 715/746
See application file for complete search history.

(56) References Cited

U.S. PATENT DOCUMENTS

| | | | |
|---|---|---|---|
| 6,456,854 B1 | 9/2002 | Chern et al. | |
| 8,250,584 B1 | 8/2012 | Reeves et al. | |
| 8,296,419 B1 * | 10/2012 | Khanna | G06F 9/5072 709/201 |
| 8,321,558 B1 * | 11/2012 | Sirota | G06F 9/5011 709/201 |
| 8,612,330 B1 * | 12/2013 | Certain | G06Q 30/06 705/37 |
| 8,965,681 B2 * | 2/2015 | Gray et al. | 701/408 |
| 2002/0082838 A1 | 6/2002 | Hinde et al. | |
| 2003/0023726 A1 | 1/2003 | Rice et al. | |
| 2003/0101225 A1 | 5/2003 | Han et al. | |
| 2003/0148773 A1 | 8/2003 | Spriestersbach et al. | |
| 2007/0180447 A1 | 8/2007 | Mazzaferri et al. | |
| 2008/0034364 A1 * | 2/2008 | Lam | G06F 8/63 718/1 |
| 2009/0006336 A1 | 1/2009 | Forstall et al. | |
| 2009/0104919 A1 | 4/2009 | Heater et al. | |
| 2009/0216910 A1 * | 8/2009 | Duchesneau | G06F 9/5072 709/250 |

(Continued)

FOREIGN PATENT DOCUMENTS

EP    1195967 A2    4/2002

OTHER PUBLICATIONS

U.S. Appl. No. 13/444,969—Final Office Action mailed May 15, 2014.

(Continued)

*Primary Examiner* — William Titcomb
(74) *Attorney, Agent, or Firm* — Banner & Witcoff, Ltd.

(57) ABSTRACT

Methods and systems for using context data captured by a computing device to generate a virtual desktop display are described herein. The computing device along with a host device may form a remote access environment whereby a virtual machine is provided on the computing device. The computing device may capture the context data and identify contextual information. The host device may then generate content based on the contextual information and incorporate the content into composite screen display data configured to display a context aware virtual desktop screen. The composite screen display data is transmitted to the computing device, and thus, the computing device is provided with a context aware virtual desktop screen.

20 Claims, 11 Drawing Sheets

(56) References Cited

U.S. PATENT DOCUMENTS

| | | | |
|---|---|---|---|
| 2009/0240554 | A1 | 9/2009 | Oswald et al. |
| 2009/0241110 | A1* | 9/2009 | Heo .................... G06F 9/45537 718/1 |
| 2009/0276771 | A1* | 11/2009 | Nickolov .............. G06F 9/4856 717/177 |
| 2010/0020697 | A1 | 1/2010 | Lewis et al. |
| 2010/0198906 | A1 | 8/2010 | Radhakrishnan et al. |
| 2010/0299436 | A1 | 11/2010 | Khalid et al. |
| 2010/0304760 | A1 | 12/2010 | Gogic |
| 2011/0054776 | A1 | 3/2011 | Petrov et al. |
| 2011/0060808 | A1 | 3/2011 | Martin et al. |
| 2011/0265183 | A1* | 10/2011 | Wu ....................... G06F 21/572 726/24 |
| 2012/0054744 | A1* | 3/2012 | Singh ..................... G06F 21/53 718/1 |
| 2012/0233549 | A1 | 9/2012 | Ricci |
| 2012/0284322 | A1 | 11/2012 | Laborezfalvi et al. |
| 2013/0091543 | A1 | 4/2013 | Wade et al. |
| 2013/0212576 | A1* | 8/2013 | Huang ................ G06F 9/45558 718/1 |
| 2014/0196032 | A1* | 7/2014 | Gupta ...................... G06F 8/63 718/1 |

OTHER PUBLICATIONS

U.S. Appl. No. 13/444,969—Non-Final Office Action mailed Nov. 21, 2013.
Sep. 8, 2014—(US) Non-Final Office Action—U.S. Appl. No. 13/444,969.
Extended Search Report off corresponding European Application No. 12771474.9, dated Sep. 30, 2014.
"MoBe: Context-Aware Mobile Applications on Mobile Devices for Mobile Users," Paolo Coppola, et. al., May 11, 2005, retrieved on Sep. 8, 2014 from website: <http://www.researchgate.net/publication/215777282_Context-Aware_Mobile_Applications_on_Mobile_Devices_for_Mobile_Users/file/9fcfd508aacf5d6123.pdf >.
International Search Report and Written Opinion of corresponding International Application PCT/US2014/037981 mailed Oct. 2, 2014.
International Search Report and Written Opinion for PCT Application No. PCT/US2012/033020, dated Oct. 24, 2013.
Office Action issued Feb. 25, 2015 in U.S. Appl. No. 13/444,969.

* cited by examiner

CONTEXT AWARE VIRTUAL DESKTOP

FIELD

Aspects described herein generally relate to computer-implemented methods, devices, computer readable media and computer-executable instructions stored thereon, and systems for using context data captured by a client device to generate a virtual desktop display.

BACKGROUND

Mobile devices, such as smartphones, tablets, laptops, etc., are increasingly being used. Their popularity is largely due to their ability to be used in various environments. Meanwhile, advancements in technology have resulted in the development of sensors, such as microelectromechanical systems (MEMS) sensors, that may be implemented in mobile devices. Such sensors allow the mobile device to capture information regarding its environment. The captured information can then be used to improve a user's experience. For example, global positioning system (GPS) coordinates captured by a sensor (e.g., GPS receiver) of a mobile device may be used to enhance a search engine search to provide location-based search results. Some users have come to enjoy and/or expect this type of context aware output.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards computer-implemented methods, devices, computer readable media and computer-executable instructions stored thereon, and systems for providing a context aware virtual desktop using contextual information obtained at a client (or endpoint) device. In particular, aspects of the disclosure include generating a supplemental frame, having content based on the contextual information, in addition to a virtual desktop screen displayed on the client device participating in a remote access environment with a host device. The actual generation of the supplemental frame may be performed by either the host device or the client device. The client device may employ object detection to detect context data, such as objects in an image captured using a camera, within the surroundings or environment of the client device. Where the client device is a mobile device, the client device may be used in numerous environments and therefore exposed to numerous objects. As such, the client device may be configured to communicate with a host or other network computing device to identify objects and/or potential objects.

In one aspect, described herein, a method comprises receiving, at a host device providing a virtual machine to a computing device (e.g., a mobile device or other client device), contextual information identified from context data captured using an input device of the computing device; generating content based on the contextual information; generating composite screen display data configured to display a composite screen, comprising a virtual desktop screen and the content; and transmitting the composite screen display data to the computing device. The composite screen display data may include pixel information configured to be rendered by the computing device, and/or commands that, when interpreted by the computing device, cause the computing device to generate and display the composite screen. Further, the method may include determining a capability of the computing device; and determining whether to generate pixel information as the composite screen display data or to generate commands as the composite screen display data based on the determined capabilities of the computing device, wherein the pixel information is configured to be rendered by the computing device, and wherein the commands are configured to cause the computing device to generate and display the composite screen when interpreted by the computing device. Determining the capability of the computing device may include determining whether the computing device comprises a graphics processing unit (GPU). Additionally, or alternatively, determining the capability of the computing device may include determining an operating system of the computing device. The method may further include determining an available bandwidth of a communication channel established between the computing device and the host. Also, whether to generate the pixel information as the composite screen display data or to generate the commands as the composite screen display data may be based on the available bandwidth.

In some examples, the contextual information may indicate an object (e.g., an icon, logo, 3D object, text, etc.) identified from an image. The image may be captured by a camera of (or connected to) the computing device. Also, the content may be displayed over the virtual desktop screen. Additionally, the host device and computing device may communicate using the Independent Computing Architecture (ICA) protocol, Remote Desktop Protocol (RDP), or various other protocols for providing a virtual machine on the computing device. Moreover, in some examples, the display data may be transmitted using Thinwire.

In some embodiments, the content may be generated based on user preferences associated with the computing device. Also, the content may include one or more options that, when selected, launch a program executed by the virtual machine of the computing device. Additionally, or alternatively, the content may include one or more options that, when selected, launch a program executed by an operating system of the computing device.

Further, the method may also include receiving location information indicating a location of the computing device; determining a subset of predefined context data based on the location information; and transmitting the subset of predefined context data to the computing device. The subset of predefined context data may include a subset of objects associated with the location information. Additionally, the method may further include determining capabilities of the computing device, wherein the content is generated based on capabilities of the computing device. Also, generating content may include searching a database for content corresponding to contextual information; and retrieving the corresponding content from the database.

In another aspect, described herein, an apparatus comprises at least one processor and memory storing computer-executable instructions. When executed by the at least one processor, the instructions may cause the apparatus to provide a virtual machine to a computing device. The instructions may also cause the apparatus to receive, from the computing device, contextual information captured using an input device (e.g., a camera, microphone, wireless communication receiver, etc.) of the computing device. Further, the instructions may cause the apparatus to generate content based on the contextual information, and generate composite screen display data configured to display a composite screen, comprising a virtual desktop screen and the content. The instructions may then cause the composite screen display data to be transmitted to the computing device. Additionally, the instructions may cause the apparatus to receive location information indicating a location of the computing device; determine a subset of predefined context data based on the location information; and transmit the subset of predefined context data to the computing device. Thus, storage capacity of the computing device may be efficiently used.

In yet another aspect, described herein, a method includes executing, by a computing device (e.g., a mobile device or other client device), a virtual machine receiver application; capturing context data from an input device of the computing device; identifying contextual information based on the context data; transmitting the contextual information to a host device, which provides the virtual machine to the computing device; and receiving, from the host device, composite screen display data configured to display a composite screen, comprising a virtual desktop screen and content corresponding to the contextual information. The method may further include rendering the composite screen based on pixel information included within the composite screen display data. Additionally, or alternatively, the method may include interpreting commands within the composite screen display data and generating the composite screen. In some embodiments, the method may also include storing a subset of predefined context data, wherein the identifying of the contextual information comprises comparing the context data with the subset of predefined context data. Also, the computing device may receive the subset of predefined contextual information from a remote computing device based on a location of the computing device. Moreover, capturing context data may include capturing images detected by a camera of the computing device, and identifying the contextual information may include detecting one or more objects within the image using a subset of predefined objects.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
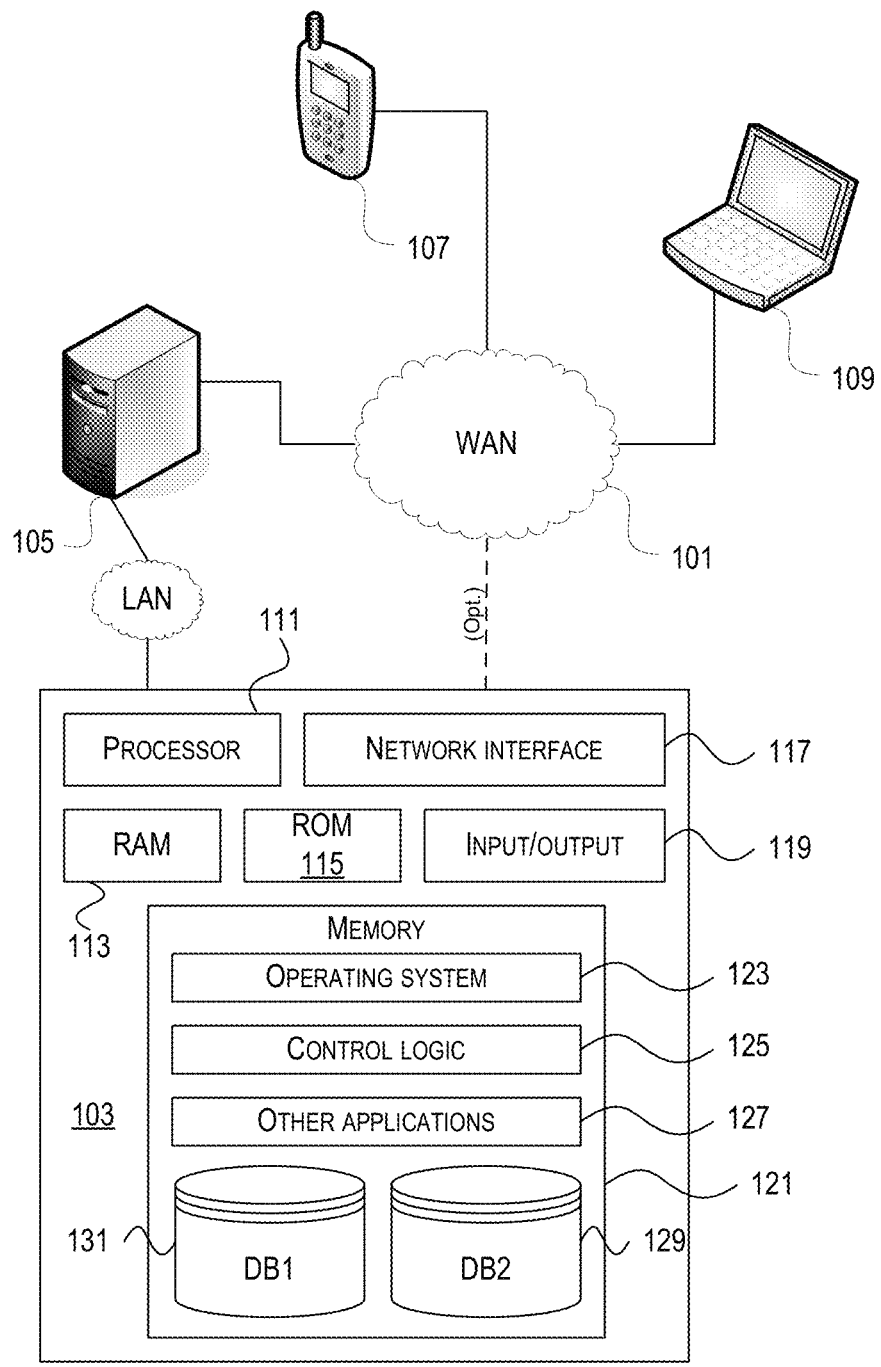
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
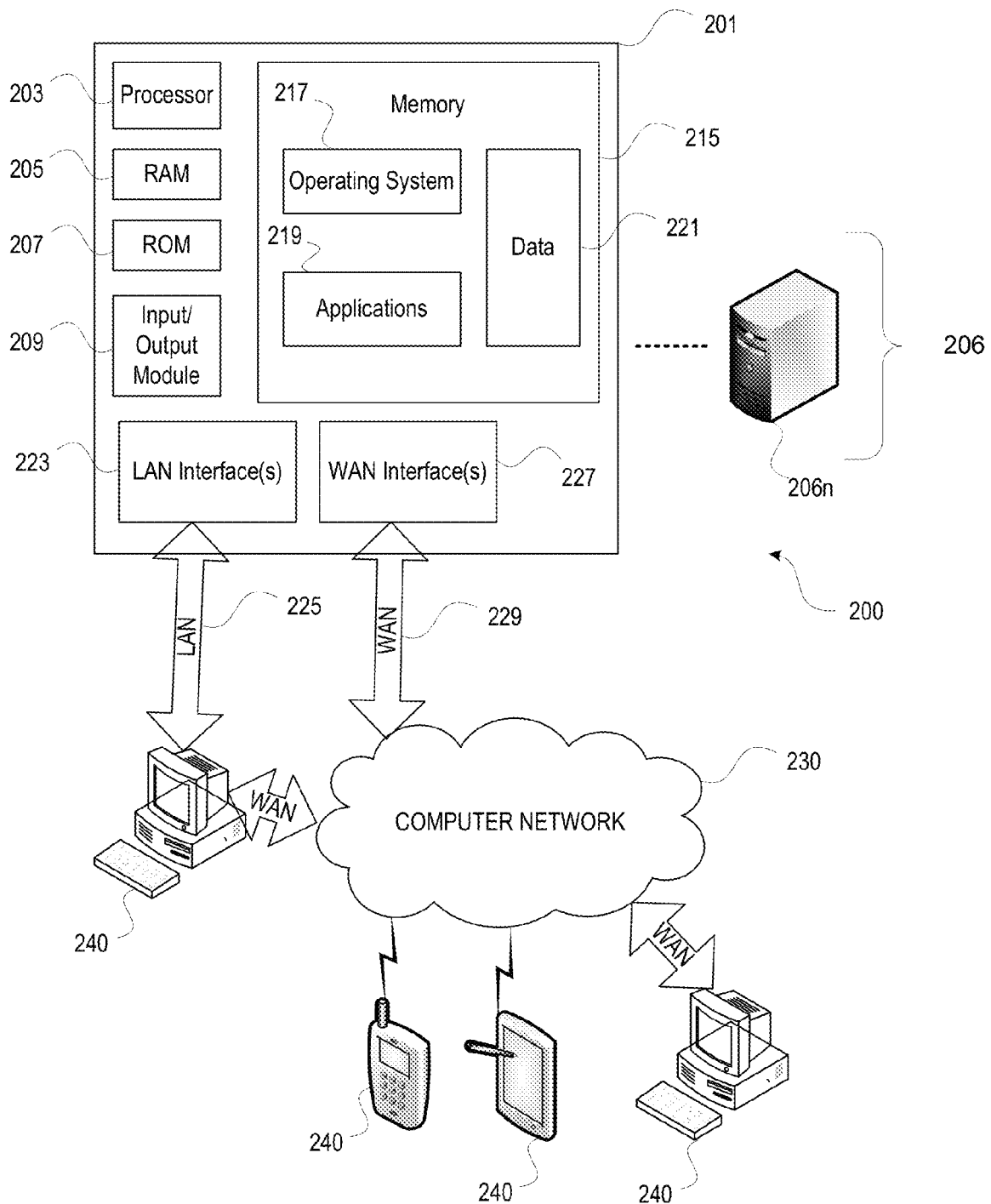
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106*a* that receives requests from a client machine 240, forwards the request to a second server 106*b*, and responds to the request generated by the client machine 240 with a response from the second server 106*b*. First server 106*a* may acquire an enumeration of applications available to the client machine 240 and well as address information associated with an application server 206 hosting an application identified within the enumeration of applications. First server 106*a* can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
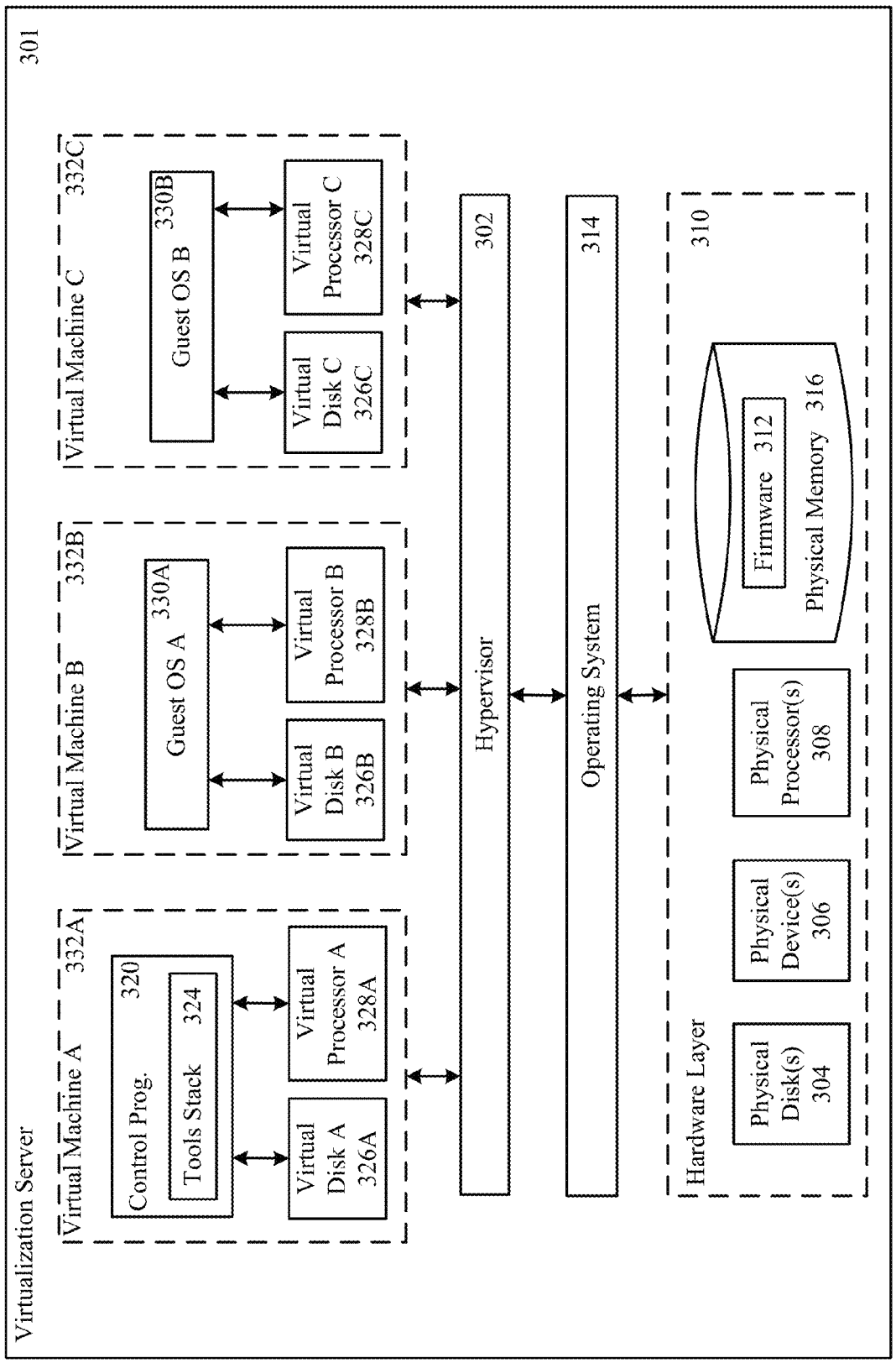
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
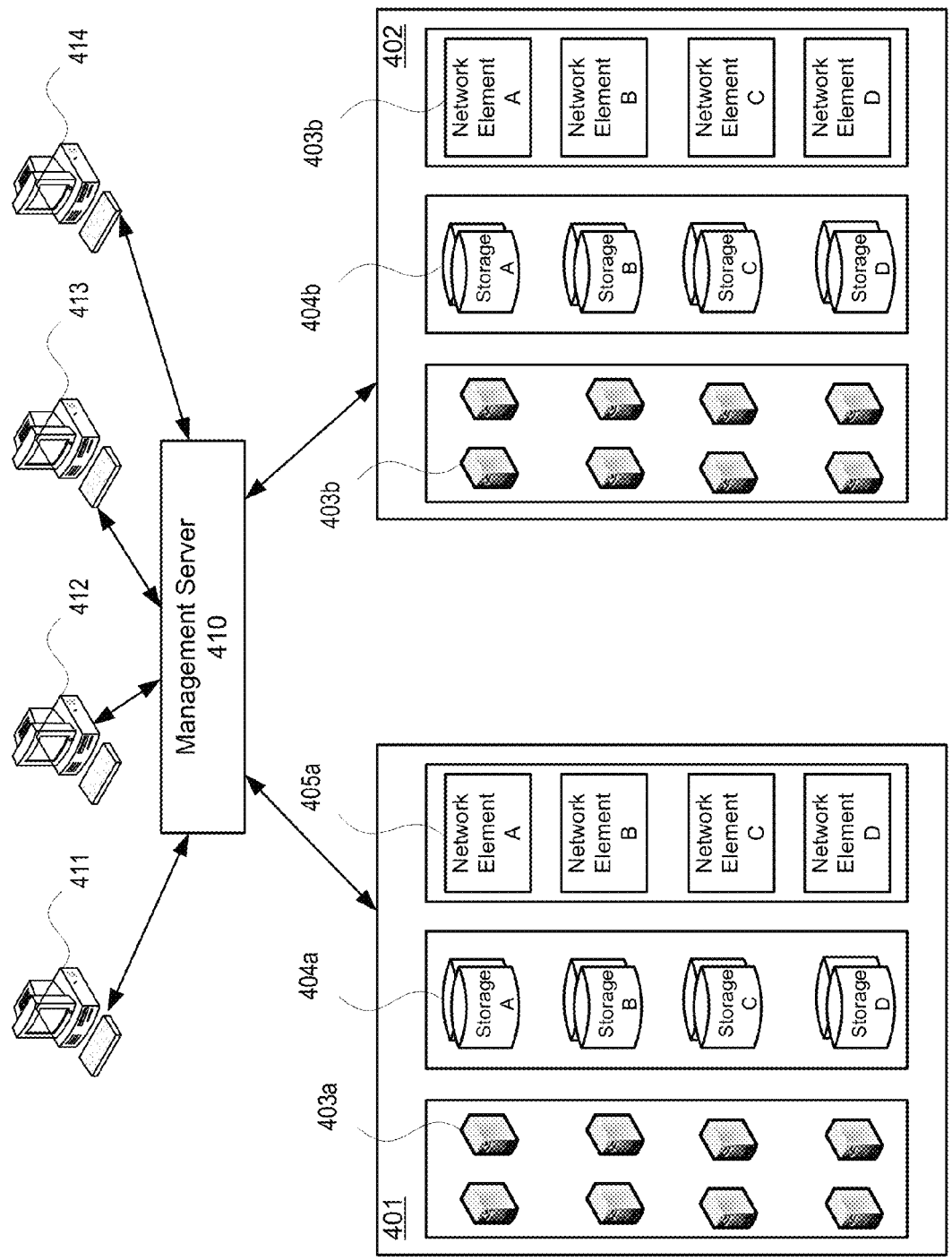
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
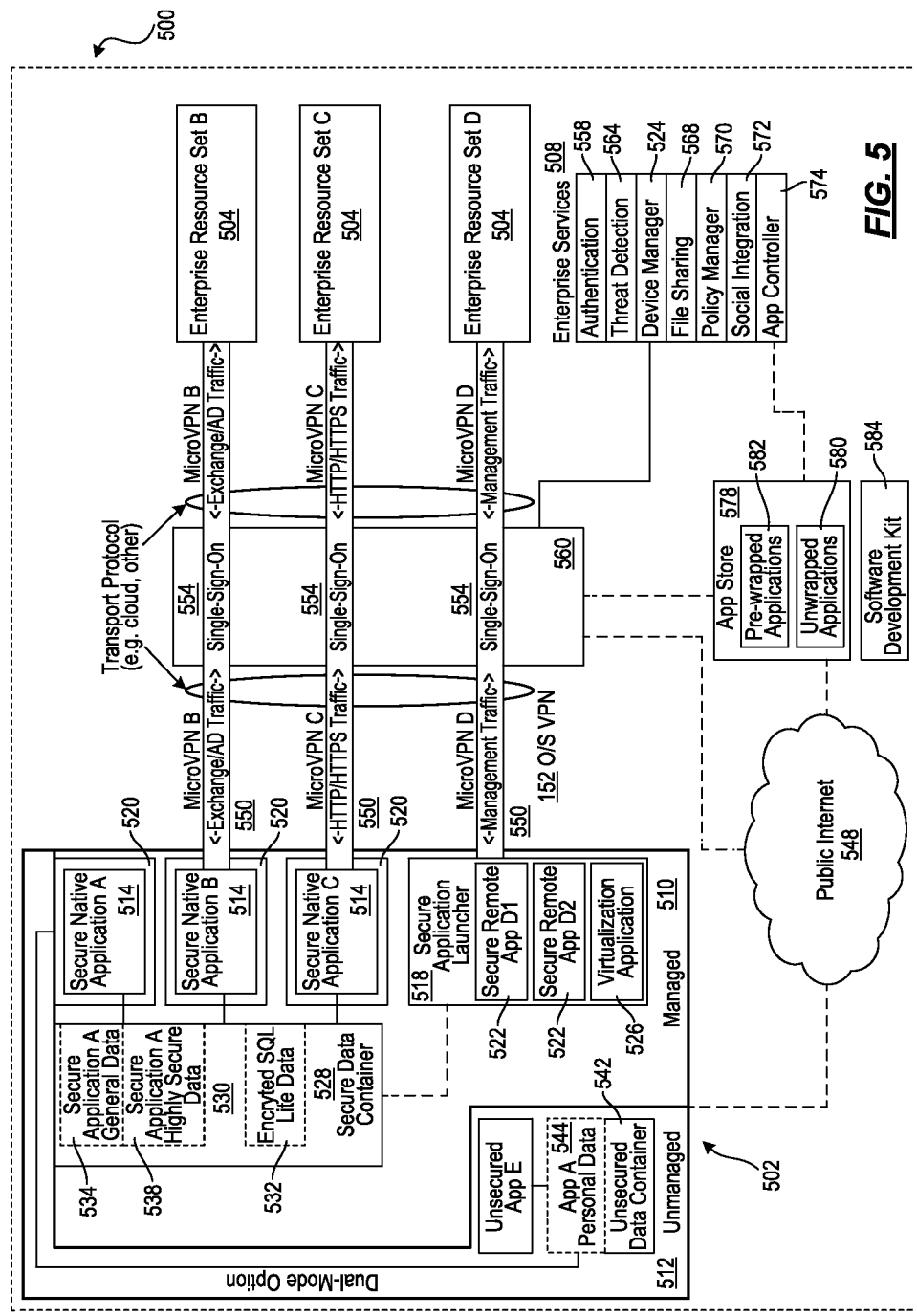
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device may run an iOS operating system, Android operating system, and/or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

The operating system of the mobile device may be separated into a managed partition 510 and an unmanaged partition 512. The managed partition 510 may have policies applied to it to secure the applications running on and data stored in the managed partition. The applications running on the managed partition may be secure applications. The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include metadata that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The applications running on the managed partition may be stabilized applications. The stabilized applications may be managed by a device manager 524. The device manager 524 may monitor the stabilized applications and utilize techniques for detecting and remedying problems that would result in a destabilized application if such techniques were not utilized to detect and remedy the problems.

The secure applications may access data stored in a secure data container 528 in the managed partition 510 of the mobile device. The data secured in the secure data container may be accessed by the secure wrapped applications 514, applications executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as AES 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured mode. In an unsecured mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface. The application store 578 may provide access to a software development kit 584. The software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
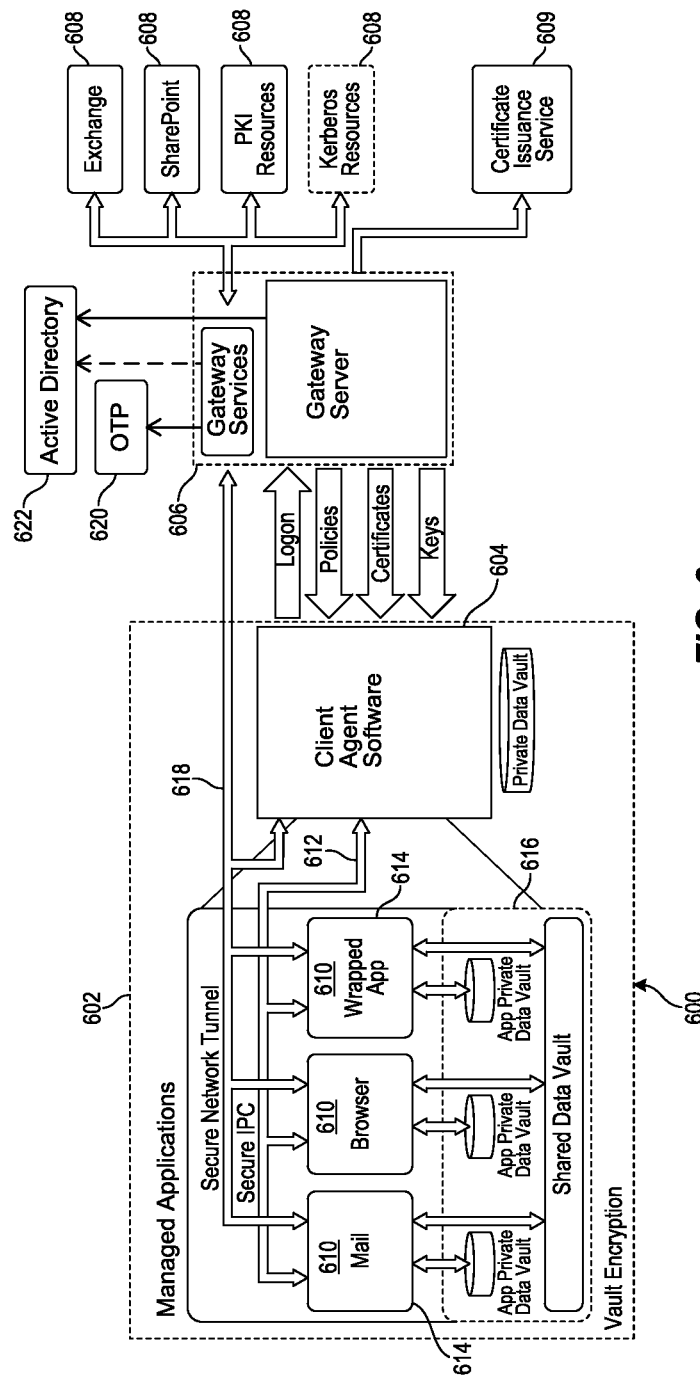
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and App Controller functionality) to access various enterprise resources 608 and services 609, such as Exchange, Sharepoint, PKI Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the HDX/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and mobile application management protocol (hereinafter "MAMP," for short), such as mobile experience technology (MDX), of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the MDX managed applications 610 on the mobile device 602.

The Secure IPC links 612 between the native applications 610 and the client agent 604 represent a management channel, which allows the client agent to supply policies to be enforced by the MAMP framework 614 "wrapping" each application. The IPC channel 612 also allows client agent 604 to supply credential and authentication information that enables connectivity and SSO to enterprise resources 608. Finally the IPC channel 612 allows the MAMP framework 614 to invoke user interface functions implemented by the client agent 604, such as online and offline authentication.

Communications between the client agent 604 and gateway server 606 are essentially an extension of the management channel from the MAMP framework 614 wrapping each native managed application 610. The MAMP framework 614 requests policy information from client agent 604, which in turn requests it from gateway server 606. The MAMP framework 614 requests authentication, and client agent 604 logs into the gateway services part of gateway server 606 (also known as NetScaler Access Gateway). The client agent 604 may also call supporting services on gateway server 606, which may produce input material to derive encryption keys for the local data vaults 616, or provide client certificates which may enable direct authentication to PKI protected resources, as more fully explained below.

In more detail, the MAMP Framework 614 "wraps" each managed application 610. This may be incorporated via an explicit build step, or via a post-build processing step. The MAMP Framework 614 may "pair" with client agent 604 on first launch of an application 610 to initialize the Secure IPC channel and obtain the policy for that application. The MAMP Framework 614 may enforce relevant portions of the policy that apply locally, such as the client agent login dependencies and some of the containment policies that restrict how local OS services may be used, or how they may interact with the application 610.

The MAMP Framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The MAMP Framework 614 is responsible for orchestrating the network access on behalf of each application 610. The client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key Derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the MAMP framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. The gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the MAMP micro VPN feature). For example, an application such as @WorkMail may utilize such a certificate. In this case, certificate-based authentication using ActiveSync protocol may be supported, wherein a certificate from the client agent 604 may be retrieved by the gateway server 606 and used in a keychain. Each managed application may have one associated client certificate, identified by a label that is defined in the gateway server.

The gateway server 606 may interact with an Enterprise special purpose web service to support the issuance of client certificates to allow relevant managed applications to authenticate to internal PKI protected resources.

The client agent 604 and the MAMP Framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the MAMP Framework to mediate https requests).

MAMP client certificate support on iOS may rely on importing a PKCS 12 BLOB (Binary Large Object) into the iOS keychain in each managed application for each period of use. MAMP client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to the gateway server 606 may also be implemented.

Both limited and full Kerberos support may be additional features. The full support feature relates to an ability to do full Kerberos login to AD 622, using an AD password or trusted client certificate, and obtain Kerberos service tickets to respond to HTTP Negotiate authentication challenges. The limited support feature relates to constrained delegation in AFEE, where AFEE supports invoking Kerberos protocol transition so it can obtain and use Kerberos service tickets (subject to constrained delegation) in response to HTTP Negotiate authentication challenges. This mechanism works in reverse web proxy (aka CVPN) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of StoreFront and App Controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Context Aware Virtual Desktop

Figure 7:
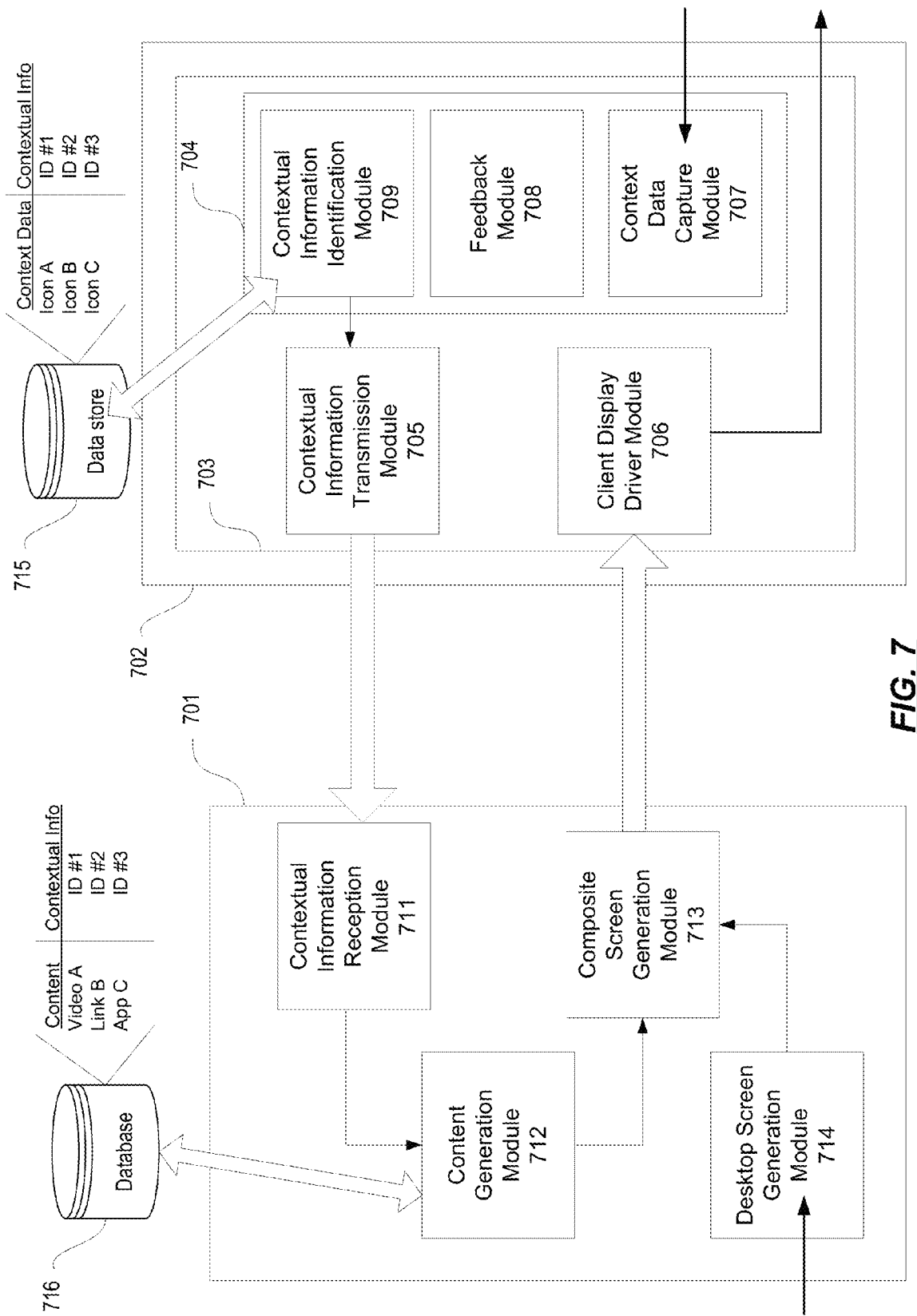
FIG. 7 depicts an illustrative system architecture for providing a context aware virtual desktop.

FIG. 7 depicts an illustrative system architecture for providing a context aware virtual desktop. The system of FIG. 7 includes a host device 701 (e.g., a server or other computing device) configured to bi-directionally communicate with a computing device, such as a mobile device 702 (e.g., smartphone, tablet, laptop, etc.). Together the host device 701 and mobile device 702 may form a remote-access environment as described above in which the host device 701 provides a virtual machine to the mobile device 702. In some embodiments, the virtual machine may be managed by a hypervisor on the host device 701. In such embodiments, the host device 701 may be configured in a similar manner as the virtualization server 301 described above with respect to FIG. 3. Further, the host device 701 may be configured to function as the server 206 described above with respect to FIG. 2.

Meanwhile, the mobile device 702 may be configured to comprise one or more of the components comprised within the mobile device 502 and/or mobile device 602 discussed above. For ease of explanation, only a receiver unit 703 of the mobile device 702 is shown. The receiver unit 703 may be configured with one or more ASICs (or other circuitry) and computer-executable instructions executed by one or more processors of the mobile device 702. As shown in FIG. 7, the receiver unit 703 may include a contextual information processing module 704, a context information transmission module 705, and a client display driver module 706. Additional components, including any one or more of the components of the mobile device 502 and mobile device 602, may also be included within the receiver unit 703. For example, the receiver unit 703 may include a module for operating a camera (e.g., a web camera or digital camera provided on the mobile device 702) and handling input from the camera.

Contextual information processing module 704, context information transmission module 705, and client display driver module 706 may each include one or more sub-modules. As shown in FIG. 7, the contextual information processing module 704 may include several sub-modules, such as a context data capture module 707, a feedback module 708, and a contextual information identification module 709. The context data capture module 707 may include an ASIC (or other circuitry) and/or computer-executable instructions such that the context data capture module 707 is configured to receive context data from one or more sensors of the mobile device 702. Such sensors (not shown in FIG. 7) may include an image sensor, an audio sensor, an accelerometer, GPS receiver, solid state compass, temperature sensor, pressure sensor, touch-sensitive sensor, etc. The context data capture module 707 may also be configured to receive text, images, audio, video, or other data that is not obtained by a sensor. For example, the context data capture module 707 may be configured to receive data obtained from another device via a wired or wireless connection. It should be understood that context data may include any information captured by, generated by, or associated with the mobile device 702, such as text, images, video, audio, etc. In some examples, the context data is particularly related to the surroundings or environment of the mobile device 702.

In some embodiments, the context data capture module 707 may include an image capture module that captures an image obtained by a camera included within, or connected to, the mobile device 702. Therefore, when a user of the mobile device 702 activates a camera on the mobile device 702, the image obtained through that camera may be captured by the image capture module.

The feedback module 708 may also include an ASIC (or other circuitry) and/or computer-executable instructions such that the feedback module 708 may be configured to provide feedback to a user of the mobile device 702. In some examples, the feedback module 708 may only provide feedback in response to the capturing of context data. The feedback provided may take various forms, including, but not limited to, text, images, video, lights, and audible alerts (e.g., beeps or other sounds). The feedback may indicate to the user that context data has been captured or provide assistance to the user so that context data can be captured. For example, in some embodiments, the feedback module 708 may include, or function as, an image tracking module that provides a visual output on a display of the mobile device 702 so that the user can see what is in view of a camera of the mobile device 702. Therefore, when a camera of the mobile device 702 is being used to capture context data (e.g., in the form of an image or video), the image tracking module may output an image on the display of the mobile device 702 showing where the camera is aiming. This form of feedback may help the user to manipulate the camera or mobile device 702 to focus the camera on a desired object.

Additionally, or alternatively, the feedback module 708 may be configured to output audio beeps or other sound alerts when, for example, a valid object is within range or view of the mobile device 702. In some instances, a user of the mobile device 702 might not realize or be able to find an object that provides the context data. For example, the context data may be emitted from an object using near field communication (NFC) without the user's knowledge. In such cases, if the context data is captured, the feedback module 708 may cause a beeping noise or light to be output to notify the user that context data is captured.

In some embodiments, the feedback module 708 may request a user for confirmation to further process and/or transmit the context data. Therefore, in some cases, the user may have the option to accept or reject the use of context data. This feature may be particularly useful when the context data capture module 707 simultaneously captures multiple pieces of context data. For example, a single image received by the context data capture module 707 may include multiple objects providing context data. The feedback module 708 may inform the user of the multiple objects and allow the user to select which objects to process. As such, the user may control which context data is used to modify the display on their mobile device 702.

The contextual information identification module 709 may also include an ASIC (or other circuitry) and/or computer-executable instructions such that the contextual information identification module 709 may be configured to identify contextual information based on the context data captured by the context data capture module 707. The contextual information may include an identifier or other metadata corresponding to the context data. To perform identification, the contextual information identification module 709 may use a data store 715 (e.g., a local data store, a cloud data store, and/or host data store) having predefined examples of context data. The data store 715 may store the predefined examples of context data in association with corresponding contextual information. The contextual information identification module 709 may compare these predefined examples with the captured context data to identify which of the predefined examples correspond to the captured context data. When a match is found between the predefined examples and the captured context data, the contextual information identification module 709 identifies the contextual information corresponding to the matching predefined example. Various thresholds may be used to determine whether a match exists. Also, when a match does exist, the identified contextual information may be provided to the contextual information transmission module 705. Although, in some cases, prior to providing the contextual information to the contextual information transmission module 705, the contextual information may be provided to the feedback module 708 for a user's approval or acceptance.

In some embodiments, the contextual information identification module 709 may include, or function as, an object detection module configured to detect objects from an image captured by the context data capture module 707. For example, a camera of the mobile device 702 may capture an image that includes an icon of an application (e.g., an icon for Microsoft Word™, an icon for Microsoft Excel™, an icon for Adobe Acrobat™, an icon for a web browser, an icon for Twitter™, etc.), and the object detection module may detect the object from within the image. To perform this detection, the object detection module may analyze the image using various known image recognition processes (e.g., pattern recognition processes). Such an analysis may include examining an image to find objects matching predefined objects stored in a local or remote data store. For example, the object detection module may analyze an image to determine whether it includes an icon, associated with a program (e.g., Microsoft Word), stored in a data store.

After the contextual information identification module 709 identifies contextual information, the feedback module 708 may indicate the identification to the user of the mobile device 702. Moreover, as mentioned above, the feedback module 708 may request a user for confirmation to further process and/or transmit the identified contextual information. This feature may be particularly helpful when more than one piece of contextual information is identified. For example, where the contextual information module 709 identifies a Microsoft Word icon and a Microsoft Excel icon from within the same image, the feedback module 708 may prompt the user to indicate which icon is to be used as contextual information. As such, the feedback module 708 may generate a window including virtual keys for the user to select in response to the prompt.

In some embodiments, when two or more different pieces of context data are captured at approximately the same time and contextual information is identified for both, the contextual information for both may be transmitted. For example, if an image captures two or more icons, contextual information identifying both icons may be transmitted to the host device 701 so that applications related to either one of the icons may be returned to the mobile device 702.

The contextual information transmission module 705 may be configured to transmit the identified contextual information to the host device 701 that is providing the mobile device 702 with a virtual machine. The contextual information transmission module 705 may include an ASIC (or other circuitry) and/or computer-executable instructions to facilitate this transmission. In some embodiments, the contextual information transmission module 705 may be configured to encrypt the contextual information before transmission, and therefore, may be configured to receive and send encryption keys as is known in the art of encryption. Further, the contextual information transmission module 705 may be configured to establish a communication channel with the host device 701. Various protocols may be used on this communication channel, and the contextual information transmission module 705 may be configured to encode or package the contextual information according to the protocol used. In some examples, the contextual information transmission module 705 may be configured to use the ICA protocol or RDP protocol to transmit the contextual information to the host device 701.

Meanwhile, the host device 701 may include an application and/or one or more ASICs (or other circuitry) configured to handle the contextual information received from the mobile device 702. The host device 701 may begin executing this application when the remote-access environment is set up (e.g., when a connection is established through which the host device 701 provides a virtual machine to the mobile device 702). This application may include a number of modules, such as a contextual information reception module 711, a content generation module 712, a composite screen generation module 713 and/or a desktop screen generation module 714. In some embodiments, these modules may be managed by a hypervisor executing on the host device 701. That is, a hypervisor on the host device 701 may be executed to create a virtual machine platform on which other devices, such as mobile device 702 may execute.

Referring to the example in FIG. 7, the host device 701 may include a contextual information reception module 711. The contextual information reception module 711 may include an ASIC (or other circuitry) and/or computer-executable instructions such that the contextual information reception module 711 may be configured to receive contextual information from one or more mobile devices 702. Further, the contextual information reception module 711 may be configured to establish a communication channel with the mobile device 702, which may include returning handshake responses. Various protocols may be used on this communication channel, and the contextual information reception module 711 may be configured to decode the contextual information according to the protocol used. In some examples, the contextual information reception module 711 may be configured to receive contextual information from the mobile device 702 using the ICA protocol or RDP protocol. If the contextual information has been encrypted, the contextual information reception module 711 may perform decryption according to various decryption processes.

The contextual information received at the host device 701 may be processed and analyzed by the content generation module 712 to generate corresponding content. The content generation module 712 may determine content to be delivered to the mobile device 702 based on the contextual information. The content may include text, images, video, audio, links (e.g., hyperlinks to webpages, links to documents (e.g., Microsoft Word documents, Microsoft Powerpoint documents, etc.) shortcuts to programs, etc.), and/or computer-executable instructions to be interpreted by the mobile device 702. For example, the content may include a script for executing an interactive screen, a splash screen, or a menu having 2D or 3D graphics. To determine the appropriate content, the content generation module 712 may search a database 716 to retrieve the content corresponding to the received contextual information. The database 716 may store content in association with corresponding contextual information. This database 716 may be located within or proximate to the host device 701 (e.g., within the content generation module 712) or may be located on a remote server. In some examples, the content generation module 712 may customize the content based on a profile or user preferences associated with the mobile device 702 (or a user thereof) from which the contextual information is received. In particular, the content may be generated based on capabilities of the mobile device 702. For example, the capabilities of the mobile device 702 may be a factor in determining whether content delivered to the mobile device 702 includes 3D graphics or just 2D graphics.

When content corresponding to the contextual information is generated, the content may be provided to the composite screen generation module 713. The composite screen generation module 713 may also receive commands and/or display data for generating a virtual desktop screen from a desktop screen generation module 714. The desktop screen generation module 714 may include an ASIC (or other circuitry) and/or computer-executable instructions configured to generate the virtual desktop screen that is displayed on the mobile device 702 when a remote access environment is established between the host device 701 and the mobile device 702. The composite screen generation module 713 may include another ASIC (or additional circuitry) and/or additional computer-executable instructions configured to merge the data for displaying the virtual desktop screen with the content generated by the content generation module 712.

In some embodiments, the composite screen generation module 713 may merge the content with the virtual desktop screen by generating data for creating an overlay window containing the content. The generated composite screen display data may include pixel information ready for rendering or commands that the mobile device 702 may use to generate display data. The composite screen generation module 713 may generate the composite screen display data based on capabilities of the mobile device 702. For example, different composite screen display data may be generated for mobile devices 702 executing different operating systems (e.g., Android, iOS, etc.). Accordingly, the composite screen generation module 713 may be configured to determine capabilities (e.g., processing capabilities) of the mobile device 702 and to determine whether pixel information or commands are to be generated. Further, in some cases, the composite screen generation module 713 may be configured to detect and evaluate an available bandwidth so that bandwidth may be considered in determining whether pixel information or commands are generated.

The composite screen generation module 713 may also be configured to transmit the composite screen display data via a communication channel (e.g., a display channel) to the mobile device 702. Various protocols may be used for this transmission. For example, the composite screen generation module 713 may use the ICA protocol or RDP protocol for transmitting the composite screen display data. In some embodiments, the composite screen generation module 713 may use Thinwire to deliver the composite screen display data from the host device 701 to the mobile device 702.

The composite screen display data may be received by the client display driver module 706 of the mobile device. The client display driver module 706 may include an ASIC (or other circuitry) and/or computer-executable instructions configured to receive and process the composite screen display data. Here, processing the composite screen display data may include rendering the display data for output on a display of the mobile device 702 or generating display data based on commands received from the host device 701 and rendering the generated display data. In the latter case, a graphics processing unit (GPU) of the mobile device 702 may be employed to interpret commands and alpha blend image data to render the composite screen on a display of the mobile device 702.

Although the above example describes a system including a mobile device 702, it should be understood that the context aware virtual desktop may be provided on any computing device. For example, instead of (or in addition to) the mobile device 702, the host device 701 may form a remote access environment with a personal computer (PC) or another server.

Figure 8:
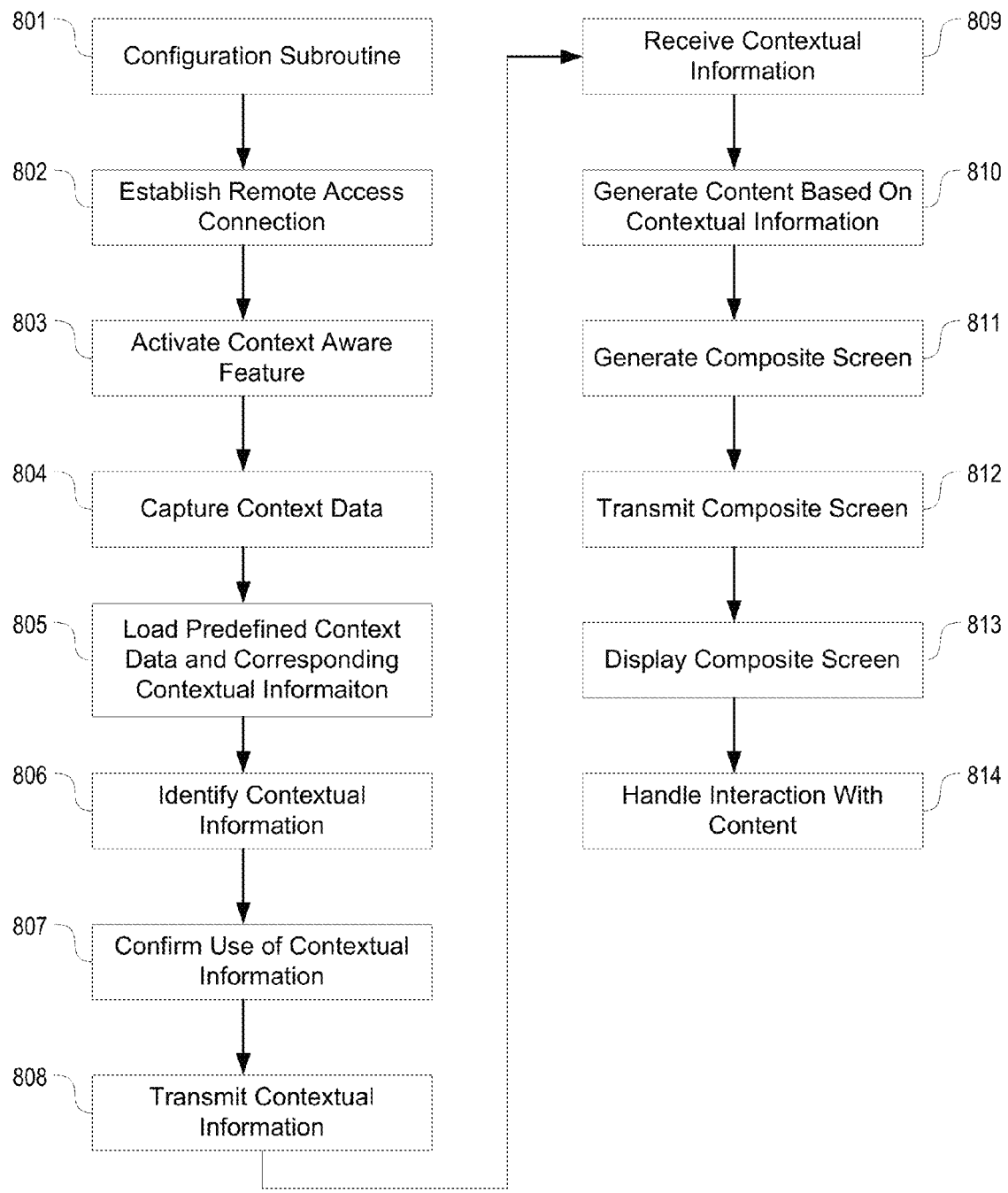
FIG. 8 illustrates an example method for providing a context aware virtual desktop.

FIG. 8 illustrates an example method for providing a context aware virtual desktop. The steps of FIG. 8 may be performed by one or more modules of the host device 701 and mobile device 702. The example method of FIG. 8 begins with step 801 in which a configuration subroutine is performed. The configuration subroutine may include a number of steps. Preliminarily, it may include installing software and/or circuitry for implementing one or more of the modules described above with respect to FIG. 7. Additionally, in step 801, a user of mobile device 702 may set up a user profile or specify user preferences. The user profile or user preferences may be used to determine what type of content may be returned based on the contextual information captured. Step 801 may also include a registration step in which the mobile device 702 is registered with the host device 701. During this registration step, the host device 701 may determine the capabilities of the mobile device 702, such as the operating system of the mobile device 702 and the type of display on the mobile device 702. The configuration subroutine of step 801 may also include installing any software updates on the host device 701 and mobile device 702.

In some examples, a process of registering or defining contextual information may be performed at step 801. A user may wish to associate certain commands (e.g., text commands or audio commands) or objects with certain contextual information. Moreover, the user may also wish to dictate what content will be generated in response to identifying the certain contextual information in the future. For example, a user may configure the contextual information identification module 709 to identify a particular object and associate that object with particular contextual information. The user may also designate an application to be launched in response to that object or which options in a menu to present in response to that object.

When a user of the mobile device 702 chooses to remotely access the host device 701, the mobile device 702 may request a connection with the host device 701 in step 802. A number of handshake communications may be exchanged between the host device 701 and mobile device 702 to establish a connection. Various protocols may be used for transmitting and receiving data via this connection, including, but not limited to, ICA and RDP. Once the connection is established, the host device 701 may provide a virtual machine to the mobile device 702. As a result, the mobile device 702 may display a virtual desktop, and may have access to various resources of the virtual machine. For example, the mobile device 702 may function as a user interface for an application running on the host device 701.

In step 803, the user of the mobile device 702 may choose to activate the context aware feature of the remote access environment. In other words, the context aware feature may be selectable so that users can dictate whether contextual information is to be used to augment the display of the mobile device 702. As such, the mobile device 702 does not have to capture context data at all times, and its display does not have to be context aware. A user may be able to turn on the context aware feature after the virtual machine is set up on the mobile device 702. The context aware feature may be turned on (or activated) by selecting a feature from within the virtual desktop. In some embodiments, the feature may be selected through an option from a menu of the virtual desktop, while in other embodiments, the feature may be activated by selecting an application on the virtual desktop. For example, the virtual desktop of the virtual machine running on the mobile device 702 may include a shortcut to an application that, when executed, provides the receiver unit 703 on the mobile device 702.

Alternatively, the context aware feature may be turned on by selecting an application stored locally on the mobile device 702. Even with the virtual desktop available on the mobile device 702, the user may still access a program stored locally on the mobile device 702 that may provide context data to the receiver unit 703. In other words, the user of the mobile device 702 may select an application that runs on top of the operating system of the mobile device 702 and allows the mobile device 702 to input context data. For example, the user may select an application to operate a camera of the mobile device 702, which may feed image data to the receiver unit 703.

If the context aware feature is not activated, the mobile device 702 may display the virtual desktop of its virtual machine as in a typical remote access environment and some of the steps in FIG. 8 might not be performed. However, assuming that the context aware feature is activated, step 804 may be performed to capture context data. In some embodiments, the context aware feature may be activated before or after step 804. Alternatively, the context aware feature may be automatically activated when an application for capturing context data is launched. For example, if an application for turning on and using a camera of the mobile device 702 is launched, the context aware feature may be automatically activated so that contextual information may be identified.

In some embodiments, a viewfinder may appear on the display of the mobile device 702 to assist the user in capturing context data. For example, when an application for providing the context aware feature is launched, the application may display a viewfinder that shows the view through a camera of the mobile device 702. Thus, capturing context data may include receiving images fed through a camera of the mobile device 702 (or connected to the mobile device).

As explained above, the context data may include various forms of data. As such, various applications and/or input devices on the mobile device 702 may be used to capture context data. For example, an application for recording audio may be launched to capture context data in the form of audible sounds. In another example, context data may include data wirelessly transmitted by an object in proximity (e.g., within a wireless transmission range) to the mobile device 702. In particular, the mobile device 702 may receive context data from an object via a near field communication (NFC) connection or Bluetooth connection when the mobile device 702 comes within a certain range of the object. If the context aware feature is deactivated, the receiver unit 703 of the mobile device 702 may ignore or reject such wirelessly transmitted context data. However, if the context aware feature is activated, the receiver unit 703 of the mobile device 702 may capture and accept the context data.

In step 805, predefined examples of context data may be stored on the mobile device 702. In particular, the predefined examples of context data may be loaded into local memory of the mobile device 702. The predefined examples of context data may be downloaded or otherwise received from a cloud computing device or the host device 701. The predefined examples of context data may include context data in association with contextual information. Further, the predefined examples of context data that are received by the mobile device 702 may be specific to a particular location of the mobile device 702. There may be a very large amount of predefined examples of context data, and therefore, it may be undesirable to store all available predefined examples of context data locally on the mobile device 702. Hence, only a subset of the predefined examples may be received in some cases. The subset of predefined examples of context data may represent context data that the mobile device 702 has a relatively high probability of encountering given its location. For example, if the mobile device 702 is moved into an office environment (e.g., to a work place of a user of the mobile device 702), the mobile device 702 may load a subset of predefined icons corresponding to software programs that a user may wish to run while in the office environment. In this example, the particular subset of predefined icons may be tailored to the user and/or office. Specifically, the mobile device 702 or device supplying the subset of predefined examples (e.g., host device 701 or a cloud computing device) may use log data (or user history data) and/or trend analysis to determine which predefined examples should be loaded. For example, the cloud computing device may determine that the user frequently accesses three programs while at her office, and therefore, may deliver icons related to those three programs when the mobile device 702 is in that office. In comparison, the cloud computing device may determine that the user frequently accesses two other programs when at home, and thus, may deliver icons related to those two other programs when the mobile device is located at the user's home.

In another example, when a user enters a museum, the mobile device 702 may receive a subset of predefined examples including objects in the museum that have associated contextual information. That is, based on the mobile device's location within the museum, the device supplying the predefined examples may determine that the mobile device 702 is likely to be used to capture objects within the museum, and therefore, may deliver related objects and their associated contextual information to the mobile device 702, which in turn may store the related objects and associated contextual information. The mobile device 702 may keep the stored data in memory as long as the mobile device 702 is in or near the museum. However, when the mobile device 702 exits the museum or moves a certain distance away from the museum, the stored data may be removed from memory of the mobile device 702.

Still, in some embodiments, a certain subset of predefined examples may be stored in the mobile device 702 regardless of location. For example, the mobile device 702 may store objects related to each of the keys of a keyboard so that a user may type on an image of a keyboard wherever he/she is and the mobile device 702 may capture the user selections. In this example, the contextual information identification module 709 may use the stored objects to recognize the user selections and the associated contextual information. Since the keys on a keyboard may be commonly used in various environments, objects representing those keys may be kept in memory of the mobile device 702 regardless of location and until manually deleted by a user.

In step 806, contextual information may be identified based on the captured context data. In some cases, the contextual information may be identified automatically if the context data matches a predefined example of context data whether or not a user indicates a selection of the context data. For example, if a camera is panned over an object, the contextual information identification module 709 may detect the object and may identify the corresponding contextual information. In other cases, identification of contextual information may be performed in response to a perceived user selection. For example, a user may select context data by physically touching (or pointing at) an object in the real world. In this case, the contextual information identification module 709 may recognize the user's selection of an object and may identify the contextual information corresponding to the selected object.

In step 807, the feedback module 708 may prompt the user to confirm the selection and identification of the contextual information. At this stage, the user may choose to cancel a selection or correct a misidentification. For example, if the user accidently selected an object and contextual information for that object is identified, the user may still have an opportunity to prevent that selection from affecting the display by declining to confirm the contextual information (which may be inferred after a predetermined period of time without a user response) or positively rejecting the selection or correcting the selection.

At step 808, the identified contextual information may be transmitted from the mobile device 702 to the host device 701. Before this transmission, the contextual information may be encoded in accordance with a communication protocol, such as ICA and RDP. Additionally, in some examples, the transmission may be encrypted using various encryption methodologies.

Subsequently, at step 809, the host device 701 may receive the transmitted contextual information. In particular, the contextual information reception module 711 may receive the contextual information. The contextual information reception module 711 may also decode the transmission to extract the contextual information and decrypt the transmission if encryption is used.

In step 810, content may be generated based on the received contextual information. The content may include text, one or more images, video, links, scripts, etc. Here, generating content may include retrieving, from a database, content corresponding to the received contextual information. This database may be located at the host device 701 or another computing device in connection with the host device 701 (e.g., a cloud computing device). In addition, generating content may include customizing the retrieved content based on user preferences or a user profile of a user associated with the mobile device 702 from which the contextual information is received. For example, the content may include only 2D images if a user preference indicates that the user only wants content in the form of 2D images. In another example, different content may be generated for different users based on their role (or position) within an organization (e.g., company) as specified in user profiles. Accordingly, a manager may receive a first type of content in response to detection of an object, while a sales representative may receive a second type of content in response to detection of the same object. In yet another example, user profiles may indicate a subscription level, such that mobile devices 702 (or users thereof) associated with higher subscription levels are provided with additional content.

In step 811, the generated content is used to generate composite screen data. When the remote access environment is established in step 802, a virtual desktop screen may be displayed on the mobile device 702. That virtual desktop might not be context aware. That is, the virtual desktop screen initially might not be influenced by the environment in which the mobile device 702 is used. However, at step 811, the host device 701 may augment the virtual desktop screen by adding the generated content. The composite screen data may be configured so that the generated content appears within the virtual desktop screen. For example, if the generated content includes an application, a shortcut to that application may appear on the virtual desktop screen. Alternatively, or additionally, the composite screen data may form a composite screen that includes the virtual desktop screen, which is unaffected by contextual information, and a supplemental frame containing the generated content. Where the generated content is included within a supplemental frame, the supplemental frame may be configured to overlay the virtual desktop screen or appear alongside of the virtual desktop screen. Here, the supplemental frame includes any area comprising the content. The supplemental frame may or may not have borders different than those of the virtual desktop screen. For example, the supplemental frame may be the area in which a 3D object overlays the virtual desktop screen.

In some embodiments, generation of the composite screen data in step 811 may include generating pixel information such that the mobile device 702 simply has to output the pixel information on its display. In other embodiments, generation of the composite screen data in step 811 may comprise generating commands that, when interpreted by the mobile device 702, can coordinate the display of the composite screen on the mobile device 702. That is, the host device 701 may transmit commands to control the mobile device 702 to form the composite screen (e.g., similar to the command remoting feature in ICA). Thus, generating the composite screen data does not necessarily entail producing pixel information.

Whether the composite screen data sent by the host device 701 includes pixel information or commands may depend on the capabilities (e.g., processing capabilities) of the mobile device 702. Prior to generating the composite screen data, the host device 701 may determine the capabilities of the mobile device 702 through a plurality of handshake communications. These handshake communications may be performed, for example, during step 802 when the remote access connection is established between the mobile device 702 and host device 701. Alternatively, the host device 701 may determine the capabilities of the mobile device 702 based on a user profile associated with the mobile device 702 set up during, for example, the configuration subroutine of step 801. As a result, the host device 701 may determine whether the mobile device 702 is suitable for interpreting commands and building the composite screen itself, or whether the host device 701 should generate the pixel information for the composite screen so that the mobile device 702 can more simply render the display using the pixel information.

In some examples, the host device 701 may determine whether or not the mobile device 702 is suitable for interpreting commands based on a type and/or version of the operating system (e.g., iOS, Android, etc.) operating on the mobile device 702. The type and/or version of the operating system may be received through the handshaking communications or user profile discussed above. Alternatively, the host device 701 may determine the suitability of the mobile device 702 by, for example, determining whether the mobile device 702 comprises a GPU. In some embodiments, the host device 701 may determine whether or not the mobile device 702 includes a GPU based on a model number (or other device identifier) of the mobile device 702. The model number may be received through the handshaking communications or user profile discussed above. If the mobile device 702 includes a GPU, then the host device 701 may send commands to the GPU of the mobile device 702, which may alpha blend the composite screen data before rendering the display (e.g., before blitting the composite screen to the display). If the mobile device 702 does not include a GPU and/or the mobile device 702 is otherwise determined to be unsuitable to receive the commands (e.g., the mobile device 702 is a significantly low power device), the host device 701 may generate the pixel information for the composite screen and transmit the pixel information so that the mobile device 702 can simply render the display with the already provided pixel information.

Additionally, or alternatively, the host device 701 may consider an available bandwidth when determining whether to send commands or whether to send pixel information. In particular, bandwidth may be considered when the generated content comprises a relatively large payload (e.g., 3D intensive graphics). If the available bandwidth is above a certain threshold, the host device 701 may determine that it is suitable to send the pixel information. On the other hand if the bandwidth is below a certain threshold, the host device 701 may determine that it is not suitable to send the pixel information and may instead send the commands. In some embodiments, rather than evaluate an actual or measured available bandwidth, the host device 701 may determine whether bandwidth is sufficient based on the type of network connection (e.g., LAN, WAN) between the host device 701 and mobile device 702. Since bandwidth may be negotiated before the connection between the mobile device 702 and host device 701 is established, the host device 701 may determine the bandwidth prior to determining whether to send commands or pixel information.

Still, another factor in determining whether to send commands or pixel information may be the payload of the composite screen data, including the virtual desktop screen and the generated content. If the composite screen data has a relatively high payload, because, for example, the generated content has a relatively high payload (e.g., is a video as opposed to an image), the host device 701 may determine that commands should be sent instead of the pixel information. On the other hand, if the composite screen data has a relatively low payload (e.g., where the content includes 2D graphics), the host device 701 may determine to generate and transmit pixel information representing the composite screen.

The composite screen data generated at step 811 may be transmitted to the mobile device 702 via a display channel at step 812. Various protocols may be implemented for carrying out the communication at this step. For example, the ICA protocol, the RDP protocol, or a Thinwire protocol may be used. The composite screen data may be transmitted (or pushed) to the mobile device 702 whether or not the mobile device 702 is presently executing an application for presenting the content including the composite screen data.

At step 813, the mobile device 702 may receive the composite screen data and render a display of the mobile device 702 in accordance with the received data. Step 813 may also include additional processes for sizing and positioning the supplemental frame. For example, where the supplemental frame is an overlay window, the client display driver module 706 may control the positioning of the overlay window and a size of the overlay window to fit the display on the mobile device 702. Moreover, size, position, and other characteristics of the overlay window may be based on user preferences. Further, where the generated content within the composite screen data includes a video, sound recording, or other executable file, the mobile device 702 may automatically launch the executable file upon displaying the composite screen.

In some embodiments, the generated content may include links or other options that users can select to interact with or manipulate the generated content. Such interactions may be handled in step 814. For example, a menu with a number of links may be displayed in the supplemental frame. One of these links may be a shortcut to an application so that when selected the application may be launched. In some cases, the application may be launched on the virtual machine so that the application is executed remotely at the host device 701, while in other cases, the application may be launched for execution by a processor of the mobile device 702. Another one of the links in the above mentioned menu may be to a video that may be executed using a program on the virtual machine or a program on the mobile device 702, or may be streamed from a cloud computing device.

Yet another example of the links of the menu may be a link (e.g., URL) to a webpage. If the link is to a webpage, selecting the link may cause the virtual machine of the mobile device 702 to launch a web browser and navigate to the corresponding webpage. Alternatively, selecting the link may cause an operating system of the mobile device 702 to launch a web browser and navigate to the corresponding webpage.

Figure 9:
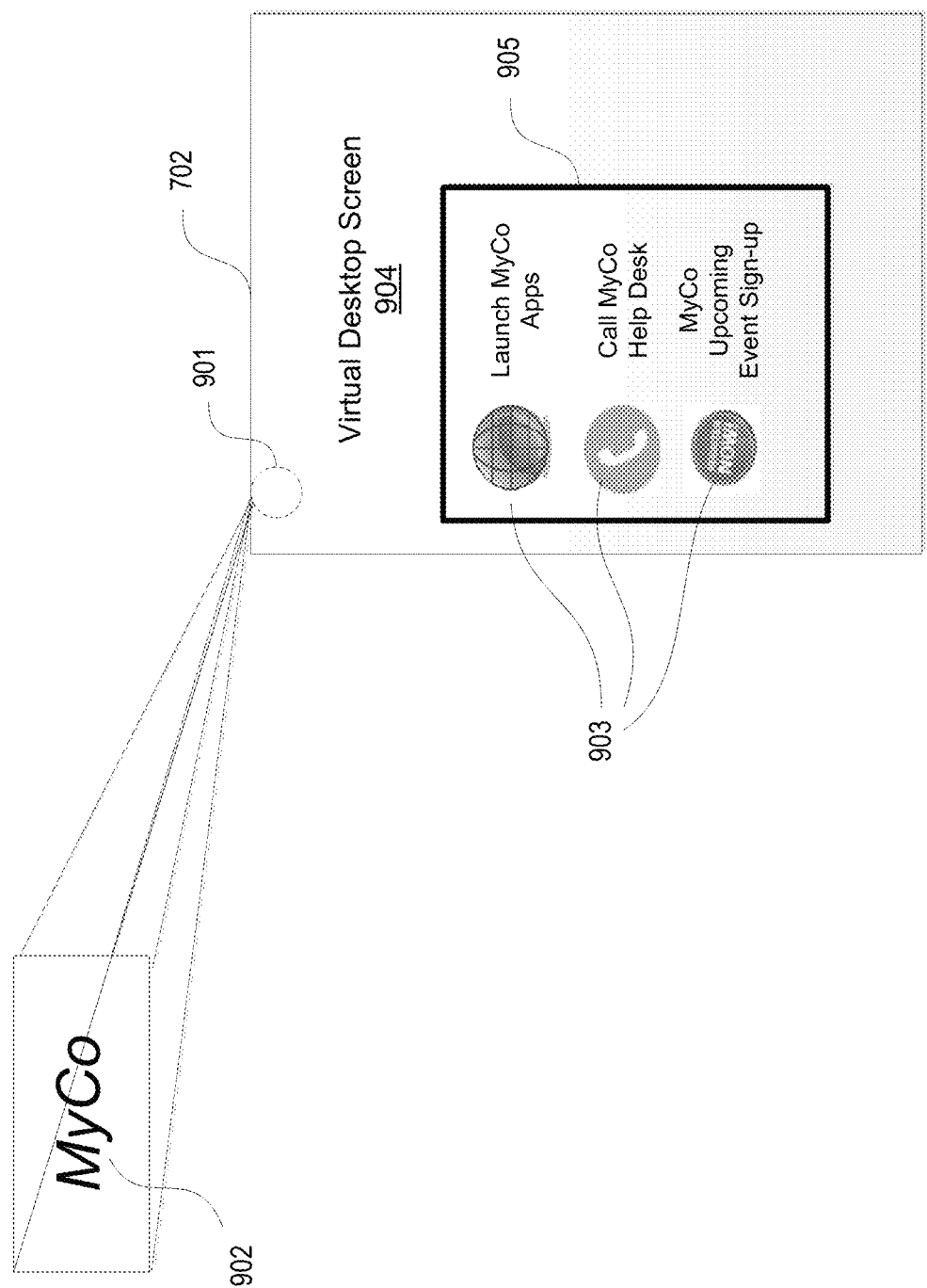
FIG. 9 illustrates an example use case in accordance with one or more illustrative aspects described herein.

FIG. 9 shows an example use case of various aspects disclosed herein. FIG. 9 illustrates a mobile device 702 having a camera 901 on its back side. As shown in FIG. 9, a user may activate the camera 901 and orient the camera 901 to aim at a logo 902 (e.g., a Microsoft Word icon (or symbol), a registered trademark of Citrix Systems, etc.). The logo 902 (which in FIG. 9 is shown as a logo for a fictitious company/organization named "MyCo" for purposes of explanation) is an example of a type of context data that the mobile device 702 may encounter. The logo 902 may be printed on a piece of paper or other material, displayed on a screen (e.g., a screen on a friend's smartphone), engraved on a product, projected on a wall, etc. After the camera 901 captures an image (or video) containing this logo 902, the contextual information identification module 709 of the mobile device 702 may process the image to identify the logo 902. Notably, in some examples, the context information identification module 709 might not wait for a user to "snap" a picture or record the video to obtain the image, and instead, simply focusing the camera on the logo 902 may cause the image to be captured. Still, in other examples, the context information identification module 709 may wait for the use to select the logo 902 by, for example, physically touching the logo 902, pointing at the logo 902, circling the logo 902 (using a finger or a stylus), etc. Additionally, or alternatively, the logo 902 may be selected by similar actions performed on an image through a viewfinder. In other words, the user may select the logo 902 by, for example, pointing to the logo 902 appearing in a viewfinder showing an image being captured using a camera of the mobile device 702, rather than pointing to the actual logo 902 printed on paper.

In any event, the contextual information identification module 709 may detect the logo 902 from the image and identify contextual information corresponding to the logo 902. Specifically, the contextual information identification module 709 may compare the image, having the logo 902, to a number of predefined logos stored in a local or remote data store. For example, the contextual information identification module 709 may perform pattern recognition to detect whether the image, having the logo 902, includes any of the predefined logos. Various pattern recognition algorithms and related processes (e.g., skew correction, edge detection, etc.) are available and could be used herein for this detection.

Further, although FIG. 7 shows the contextual information identification module 709 within the mobile device 702, it may be implemented, in part or in its entirety, on another device. For example, the contextual information identification module 709 may transmit the captured image to a cloud computing device and/or the host device 701 and the pattern recognition may be performed on one of these external devices. In cases where pattern recognition is not performed on the mobile device 702, the contextual information identification module 709 may compress the contextual information (e.g., the captured image) before sending the contextual information off for processing. In some cases, for example, where a large number of potential predefined logos exist, it may be advantageous for the mobile device 702 to utilize another device to perform pattern recognition. Still, in some cases, a hybrid solution may be implemented where pattern recognition may be performed by the mobile device 702 first, and if a match is not detected, then the captured image may be transmitted to an external device that performs a second pattern recognition process.

If the contextual information identification module 709 detects the logo 902 and identifies contextual information corresponding to the logo 902, the contextual information may be transmitted to the host device 701 (not shown in FIG. 9). The host device 701 may generate content 903 based on the contextual information corresponding to the logo 902. For example, referring to FIG. 9, the content 903 may include images, text, video, applications, links, etc. related to "MyCo" because the logo 902 has been identified as being associated with "MyCo." The host device 701 may further generate a composite screen including a virtual desktop screen 904 and a supplemental frame 905. As shown in FIG. 9, the supplemental frame 905 may overlay the virtual desktop screen 904.

FIG. 9 also shows that the content 903 may appear within the supplemental frame 904. Here, the content 903 may include a menu with several options. Each option may include a separate link with different functionality. For example, one link may cause the virtual machine on the mobile device 702 to launch an application installed on the host device 701. The host device 701 may execute the application such that a corresponding interface is displayed on the virtual desktop screen 904 of the mobile device 702. Additionally, or alternatively, selecting the link may cause the host device 701 to fetch an application from the web and subsequently install and launch the application if that application is not already available on the host. Still, in some cases, selecting the link may cause a processor of the mobile device 702 (as opposed to the host device 701) to fetch, install, launch, and/or execute the application.

Another one of the links in the menu may cause the mobile device 702 to establish a voice connection. The voice connection may be established between the mobile device 702 and a target device. In some embodiments, the voice connection may run through the host device 701. Also, the target device may be a predetermined device associated with the link (which is determined when the content is generated). For example, the target device may be a point of contact associated with "MyCo" when the logo 902 associated with "MyCo" is detected. Alternatively, the link may launch an application or generate a web interface that allows the user of the mobile device 702 to specify the target device.

Still, another one of the links of the menu may cause the virtual machine on the mobile device 702 to launch a web browser installed on the host device 701. The host device 701 may execute the web browser and navigate to a predetermined URL associated with the link. For example, a web browser executing on the host device 701 may navigate to a web page through which one may register for an event related to the captured logo 902. The host device 701 may then display the web page over the virtual desktop screen 904. In some examples, the host device 701 may auto-fill one or more fields in the web page based on a user profile associated with the mobile device 702.

Notably, the content 903 (or a portion thereof) may be related to the logo 902. Thus, together the mobile device 702 and host device 701 can create a context aware virtual desktop. Further, from the above example, it should be understood that any number of logos or other indicia surrounding the mobile device 702 could serve as context data and could trigger the delivery of corresponding content so that the virtual desktop is context aware. It should also be understood that various relationships between context data, such as logo 902, and content 903 may be established. For example, the content 903 could include advertisements for products or services similar to those offered by a company associated with the logo 902. Also, the content 903 could include substitute content if content associated with logo 902 is not found. For example, if the logo 902 corresponds to an application that generates spreadsheets (e.g., Microsoft Excel), but that application is not available (e.g., not installed on the host device 701), the content 903 may include a link to another similar application (e.g., Apple's Numbers) as a substitute or replacement.

Figure 10A:
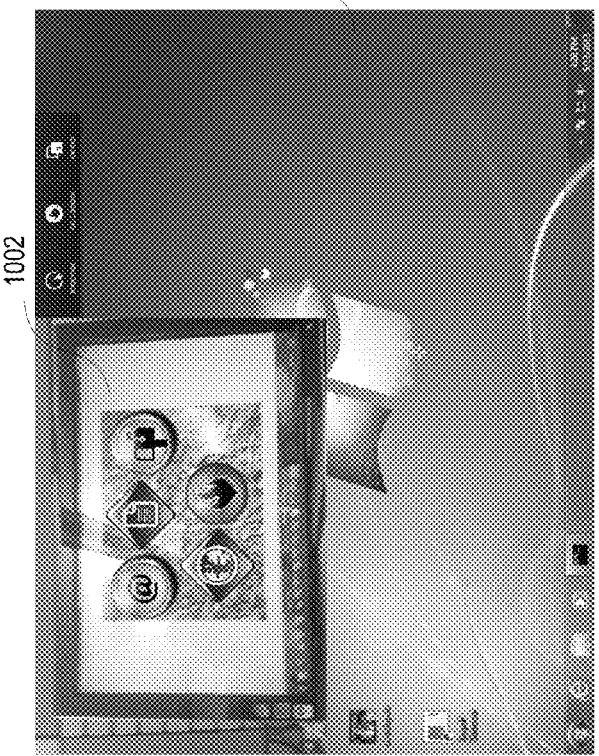
FIGS. 10A and 10B illustrate example screen shots of a display on a computing device configured to provide a context aware virtual desktop.
Figure 10B:
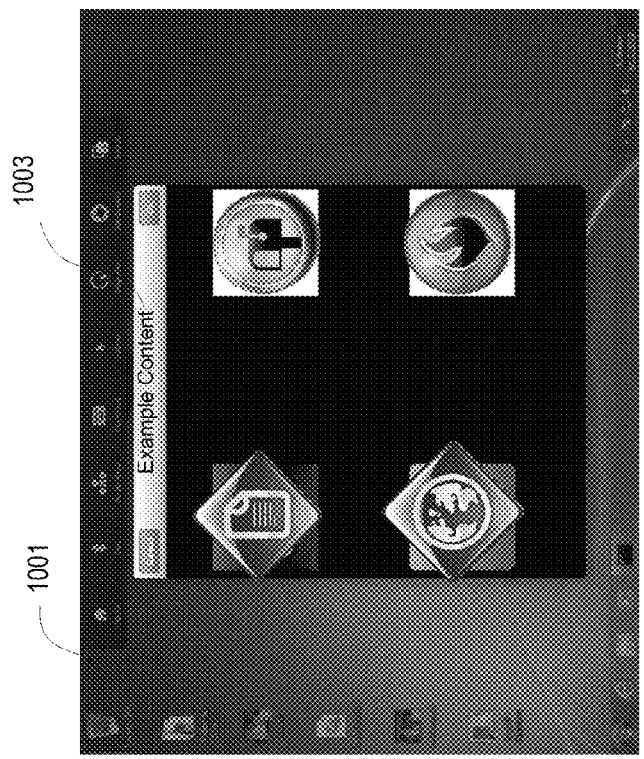

FIGS. 10A and 10B illustrate example screen shots of a display on a computing device, such as mobile device 702, configured to provide a context aware virtual desktop. FIG. 10A illustrates a virtual desktop screen 1001 with a viewfinder window 1002 overlaying the virtual desktop screen. The viewfinder window 1002 may appear when a user initiates operation of a camera of the computing device (e.g., mobile device 702) or launches a particular application designed to capture context data with a camera. In the example of FIG. 10A, as shown through the viewfinder window 1002, the camera of the computing device may be focused on another screen including a plurality of icons.

When the icons in the viewfinder window 1002 are identified by, for example, the contextual information identification module 709, the host device 701 (not shown), which provides the virtual desktop screen 1001, may send a composite screen as shown in FIG. 10B to the computing device. This composite screen may include the virtual desktop screen 1001 and a supplemental frame 1003. As illustrated in FIG. 10B, the supplemental frame 1003 may overlay the virtual desktop screen 1001. Further, the supplemental frame 1003 may include shortcuts to applications related to the icons visible through the viewfinder window 1002. As a result, a user may select one of the icons from the supplemental frame 1003 to launch an associated application, and the launched application may be executed on the virtual machine of the computing device (and thus by a processor of the host device 701) or by a processor of the computing device itself.

Notably, the viewfinder window 1002 is not illustrated in FIG. 10B because, in some examples, the viewfinder window 1002 may close once the logos are identified or once the composite screen is received. In other cases, however, the viewfinder window 1002 may remain open and continue capturing contextual data (e.g., additional logos). In such cases, the viewfinder window 1002 could appear over the virtual desktop screen 1001 in FIG. 10B as well.

In short, FIGS. 10A and 10B illustrate how objects in an environment surrounding a computing device (e.g., a mobile device 702) may be captured, identified, and used to generate content to augment a virtual desktop screen (e.g., the virtual desktop screen 1001 of FIG. 10A) thereby providing a context aware virtual desktop (e.g., the composite screen of FIG. 10B including both the virtual desktop screen and the supplemental frame 1003). From this example, one should understand that a benefit of the context aware virtual desktop (or composite screen) may be that a user can more easily launch applications that the user might otherwise not have access to without first installing or might otherwise have difficulty locating on the virtual desktop.

Figure 11:
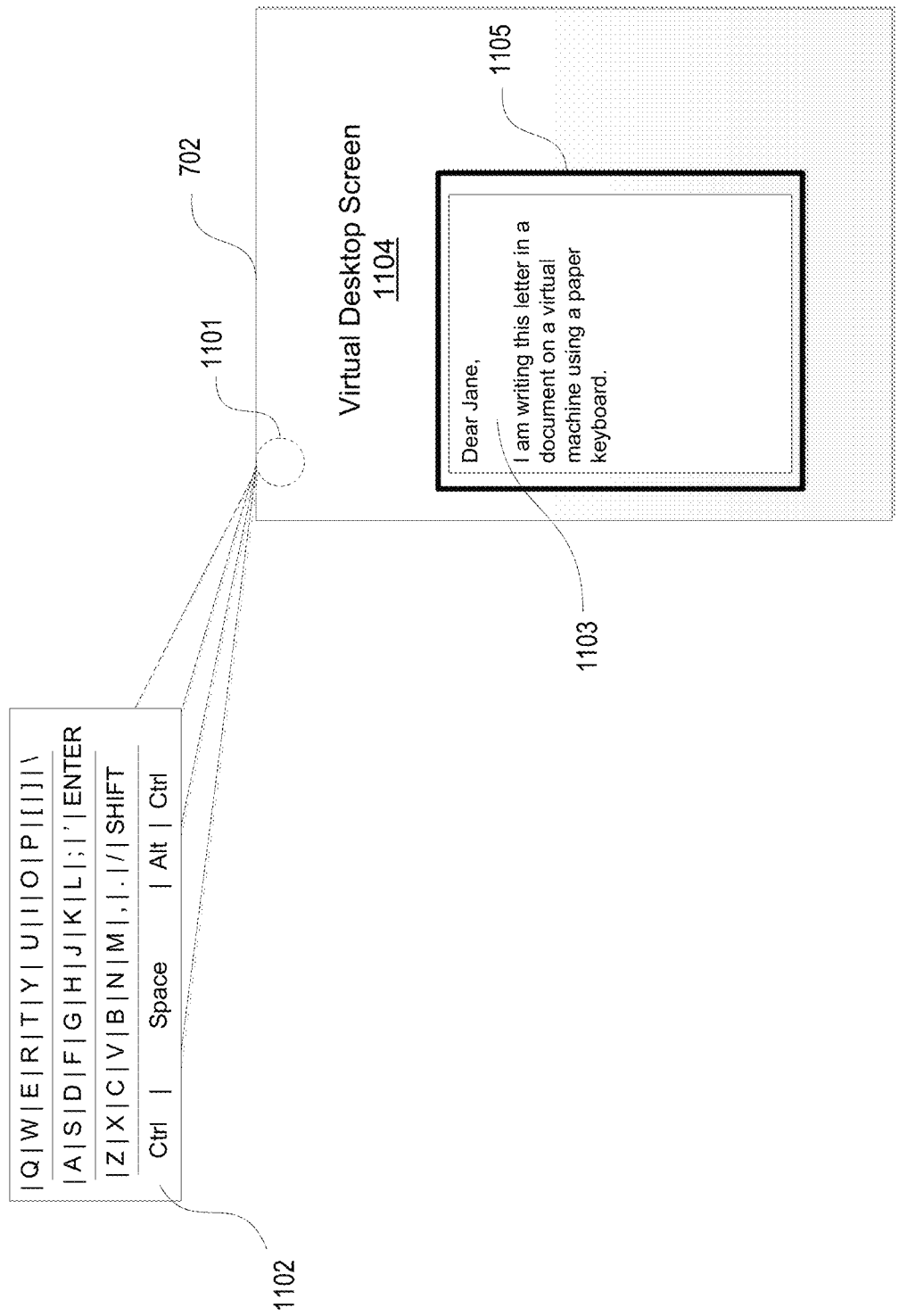
FIG. 11 illustrates another example use case in accordance with one or more illustrative aspects described herein.

FIG. 11 shows another example use case of various aspects disclosed herein. FIG. 11 illustrates a mobile device 702 having a camera 1101 on its back side. As shown in FIG. 11, a user may activate the camera 1101 and orient the camera 1101 to aim at a keyboard 1102 (e.g., a QWERTY keyboard). The keyboard 1102 is another example of a type of context data that the mobile device 702 may encounter. The keyboard 1102 may be printed on a piece of paper or other material, displayed on a screen, engraved, projected on a surface, etc. With the camera 1101 focused on the keyboard 1102, a user may begin to physically touch (or otherwise select) certain areas of the keyboard 1102. As the user selects certain areas of the keyboard 1102, the contextual information identification module 709 of the mobile device 702 may process the images fed through the camera 1101 to detect the selections and identify corresponding keys. Therefore, a user may, for example, touch a part of a keyboard 1102 printed on a sheet of paper, and the contextual information identification module 709 of the mobile device 702 may recognize the user's selection and identify a corresponding key on a keyboard having a specific value (e.g., letter "A"). More specifically, for example, when a user touches the letter "B" on a paper keyboard 1102, the contextual information identification module 1102 may detect that the user selected a key corresponding to the letter "B" and may identify "B" as the contextual information to be delivered to the host device 701.

To detect the selected keys, the contextual information identification module 709 may compare the images to a set of predefined objects stored in a local or remote data store. The predefined objects may include letters and other characters or symbols that are commonly found on keyboards. Image processing can therefore be performed to detect whether the selections in the captured images match the letters, characters, or symbols included in the predefined objects. If matches are found, then values for the matching predefined objects can be extracted and used as contextual information. This contextual information may then be transmitted to the host device 701 (not shown in FIG. 11). The host device 701 may generate content 1103 based on the contextual information received from the mobile device 702. Here, where the contextual information represents letters, characters, or symbols selected from a keyboard 1102, the host device 701 may generate a document having text corresponding to the contextual information as the content 1103. The host device 701 may incorporate the content 1103 (e.g., document having text) into a composite screen, including a virtual desktop screen 1104 and a supplemental frame 1105. As shown in FIG. 11, the supplemental frame 1105 may overlay the virtual desktop screen 1104.

FIG. 11 also shows that the content 1103 may appear within the supplemental frame 1105. Specifically, the supplemental frame 1105 may include the document with text reflecting the selections a user makes by touching a paper keyboard 1102 in view of a camera 1101 on the mobile device 702. In light of the example of FIG. 11, one should appreciate that a user may cause a document with text to be created and displayed on a virtual machine of a computing device (e.g., a mobile device 702) by touching areas on a sheet of paper having an image of a keyboard printed thereon. A benefit of this may be that different users can have various customized keyboards, and may use such keyboards for typing into a document executing on a virtual machine.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
receiving, at a host device comprising a hypervisor that provides a virtual machine to a computing device, location information indicating a location of the computing device;
determining a subset of predefined context data based on the location of the computing device;
storing the subset of predefined context data;
transmitting, by the host device, the subset of predefined context data to the computing device;
receiving, at the host device, contextual information identified from context data captured using an input device of the computing device, wherein the identifying of the contextual information comprises comparing the captured context data with the subset of predefined context data;
generating content based on the contextual information;
generating composite screen display data configured to display a composite screen, comprising a virtual desktop screen and the content, the virtual desktop screen comprising a user interface for an operating system of the virtual machine; and
transmitting, by the host device, the composite screen display data to the computing device.

2. The method of claim 1, wherein the composite screen display data comprises pixel information configured to be rendered by the computing device, or one or more commands that, when interpreted by the computing device, cause the computing device to generate and display the composite screen.

3. The method of claim 1, further comprising:
determining a capability of the computing device; and
determining whether to generate pixel information as the composite screen display data or to generate one or more commands as the composite screen display data based on the capability of the computing device,
wherein the pixel information is configured to be rendered by the computing device, and
wherein the one or more commands are configured to cause the computing device to generate and display the composite screen when interpreted by the computing device.

4. The method of claim 3, wherein the determining of the capability of the computing device comprises determining whether the computing device comprises a graphics processing unit.

5. The method of claim 3, wherein the determining of the capability of the computing device comprises determining an operating system of the computing device.

6. The method of claim 3, further comprising:
determining an available bandwidth of a communication channel established between the computing device and the host device,
wherein the determining of whether to generate the pixel information as the composite screen display data or to generate the one or more commands as the composite screen display data is further based on the available bandwidth.

7. The method of claim 1, wherein the contextual information indicates an object identified from an image, and wherein the content is displayed over the virtual desktop screen.

8. The method of claim 1, wherein the content is generated based on a user preference associated with the computing device.

9. The method of claim 1, wherein the content comprises one or more options that, when selected, launch a program executed by the virtual machine provided to the computing device.

10. The method of claim 1, wherein the content comprises one or more options that, when selected, launch a program executed by an operating system of the computing device.

11. The method of claim 1, further comprising:
determining a capability of the computing device,
wherein the content is generated based on the capability of the computing device.

12. The method of claim 1,
wherein the capturing of the context data comprises capturing an image detected by a camera of the computing device, the image comprising a logo,
wherein the identifying of the contextual information further comprises detecting the logo within the image using a subset of predefined logos,
wherein the content comprises a shortcut to a computer program, and
wherein the method further comprises executing the computer program in response to a selection of the shortcut.

13. A computing system, comprising:
at least one processor comprising hardware;
non-transitory memory storing computer-executable instructions that, when executed by the at least one processor, cause the computing system to:
provide a hypervisor that creates a virtual machine for a computing device that is remote from the computing system;
receive, from the computing device, location information indicating a location of the computing device;
determine a subset of predefined context data based on the location of the computing device;

store the subset of predefined context data;

transmit the subset of predefined context data to the computing device;

receive, from the computing device, contextual information identified from context data captured using an input device of the computing device, wherein the identifying of the contextual information comprises comparing the captured context data with the subset of predefined context data;

generate content based on the contextual information;

generate composite screen display data configured to display a composite screen, comprising a virtual desktop screen and the content, the virtual desktop screen comprising a user interface for an operating system of the virtual machine; and transmit the composite screen display data to the computing device.

14. The computing system of claim 13, wherein the composite screen display data comprises pixel information configured to be rendered by the computing device, or one or more commands that, when interpreted by the computing device, cause the computing device to generate and display the composite screen.

15. The computing system of claim 13, wherein the memory further stores computer-executable instructions that, when executed by the at least one processor, cause the computing system to:

determine a capability of the computing device; and determine whether to generate pixel information as the composite screen display data or to generate one or more commands as the composite screen display data based on the capability of the computing device, wherein the pixel information is configured to be rendered by the computing device, and wherein the one or more commands are configured to cause the computing device to generate and display the composite screen when interpreted by the computing device.

16. The computing system of claim 13, wherein the capturing of the context data comprises capturing an image detected by a camera of the computing device, the image comprising a logo, wherein the identifying of the contextual information further comprises detecting the logo within the image using a subset of predefined logos, wherein the content comprises a shortcut to a computer program, and wherein the memory further stores computer-executable instructions that, when executed by the at least one processor, cause the computing system to execute the computer program in response to a selection of the shortcut.

17. A method, comprising:

executing, by a computing device, a virtual machine receiver application in response to selection of an option on a virtual desktop screen of a virtual machine provided by a host device;

capturing, using the virtual machine receiver application, context data from an input device of the computing device, wherein the capturing of the context data comprises capturing an image detected by a camera of the computing device, the image comprising a logo;

identifying contextual information based on the context data, wherein the identifying of the contextual information comprises detecting the logo within the image using a subset of predefined logos;

transmitting the contextual information to the host device, which comprises a hypervisor that provides the virtual machine to the computing device;

receiving, from the host device, composite screen display data configured to display a composite screen, comprising the virtual desktop screen and content corresponding to the contextual information, the virtual desktop screen comprising a user interface for an operating system of the virtual machine and the content comprising a shortcut to a computer program; and executing the computer program in response to a selection of the shortcut.

18. The method of claim 17, further comprising:

rendering the composite screen based on pixel information included within the composite screen display data.

19. The method of claim 17, further comprising:

interpreting one or more commands within the composite screen display data and generating the composite screen.

20. The method of claim 17 further comprising:

transmitting, from the computing device, location information indicating a location of the computing device; and receiving, at the computing device, the subset of predefined logos from a remote computing device based on the location of the computing device.

* * * * *